US011668797B2

(12) United States Patent
Vasanthakumaribabu et al.

(10) Patent No.: US 11,668,797 B2
(45) Date of Patent: Jun. 6, 2023

(54) INTELLIGENT RADAR ELECTRONIC CONTROL UNITS IN AUTONOMOUS VEHICLES

(71) Applicant: Micron Technology, Inc., Boise, ID (US)

(72) Inventors: Anakha Vasanthakumaribabu, Jersey City, NJ (US); Poorna Kale, Folsom, CA (US); Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 467 days.

(21) Appl. No.: 16/719,196

(22) Filed: Dec. 18, 2019

(65) Prior Publication Data

US 2021/0190913 A1 Jun. 24, 2021

(51) Int. Cl.
G01S 7/41 (2006.01)
G06N 5/04 (2023.01)
G01S 13/931 (2020.01)
G01S 13/89 (2006.01)

(52) U.S. Cl.
CPC .............. G01S 7/417 (2013.01); G01S 13/89 (2013.01); G01S 13/931 (2013.01); G06N 5/04 (2013.01); G01S 2013/9318 (2020.01); G01S 2013/9319 (2020.01); G01S 2013/93185 (2020.01)

(58) Field of Classification Search
CPC ........ G01S 13/86; G01S 13/89; G01S 13/931; G01S 2013/9316; G01S 2013/9318; G01S 2013/93185; G01S 2013/9319; G01S 2013/9322; G01S 2013/93271; G01S 7/003; G01S 7/356; G01S 7/417; G06N 3/049; G06N 3/0635; G06N 3/08; G06N 5/04

See application file for complete search history.

(56) References Cited

U.S. PATENT DOCUMENTS 9,847,124 B2 12/2017 Hu et al.
10,141,716 B1 11/2018 Lenius et al.
10,421,453 B1 9/2019 Ferguson et al.
(Continued)

FOREIGN PATENT DOCUMENTS

GB 2597070 1/2022
WO 2021138358 7/2021

OTHER PUBLICATIONS

Chantelle Dubois, "What Is Solid State LiDAR and Is It Faster, Cheaper, Better?", https://www.allaboutcircuits.com/news/solid-state-lidar-faster-cheaper-better/, 2018.
(Continued)

Primary Examiner — Timothy X Pham
(74) Attorney, Agent, or Firm — Greenberg Traurig

(57) ABSTRACT

Systems, methods and apparatuses of radar Electronic Control Units (ECUs) of autonomous vehicles. A radar ECU can include: a memory configured to store a radar image and an Artificial Neural Network (ANN); an inference engine configured to use the (ANN) to analyze the radar image and generate inference results; and a communication interface coupled to a computer system of a vehicle to implement an advanced driver assistance system to operate the controls according to the inference results and a sensor data stream generated by sensors configured on the vehicle.

15 Claims, 10 Drawing Sheets

(56) References Cited

U.S. PATENT DOCUMENTS

| | | | |
|---|---|---|---|
| 11,351,991 | B2 | 6/2022 | Ghafarianzadeh et al. |
| 11,378,965 | B2 | 7/2022 | Codevilla et al. |
| 11,385,642 | B2 | 7/2022 | Haggblade et al. |
| 2014/0081893 | A1* | 3/2014 | Modha ............... G06N 3/063 706/26 |
| 2017/0221560 | A1 | 8/2017 | Hu et al. |
| 2018/0225562 | A1* | 8/2018 | van der Made ....... G06N 3/063 |
| 2018/0301729 | A1 | 10/2018 | Havansi |
| 2019/0025094 | A1 | 1/2019 | Lewis et al. |
| 2019/0057314 | A1* | 2/2019 | Julian ............... G06N 3/08 |
| 2019/0138894 | A1 | 5/2019 | Yakopcic et al. |
| 2019/0279366 | A1* | 9/2019 | Sick ............... G06K 9/6256 |
| 2019/0324205 | A1 | 10/2019 | Sharma et al. |
| 2019/0387185 | A1 | 12/2019 | Hicks |
| 2019/0391251 | A1* | 12/2019 | Bharadwaj, Jr. ...... G01S 13/583 |
| 2020/0175315 | A1* | 6/2020 | Gowaikar ............. G06V 20/56 |
| 2020/0209864 | A1* | 7/2020 | Chen ................. G05D 1/0221 |
| 2020/0326718 | A1* | 10/2020 | Kandemir ........... G05D 1/0221 |
| 2021/0133541 | A1 | 5/2021 | Vasanthakumaribabu et al. |
| 2021/0215753 | A1 | 7/2021 | Price et al. |
| 2021/0255637 | A1 | 8/2021 | Kale et al. |
| 2021/0326687 | A1 | 10/2021 | Liu et al. |
| 2021/0381960 | A1 | 12/2021 | Na et al. |
| 2022/0026540 | A1 | 1/2022 | Olivier |
| 2022/0026573 | A1 | 1/2022 | Baribault et al. |
| 2022/0026576 | A1 | 1/2022 | Baribault et al. |

OTHER PUBLICATIONS

Lidar, Wikipedia, printed on Oct. 31, 2019.
Philip E. Ross, "Lumotive Says It's Got a Solid-State Lidar That Really Works", IEEE Spectrum, https://spectrum.ieee.org/cars-that-think/transportation/sensors/lumotive-says-its-got-a-solidstate-lidar-that-really-works, Mar. 21, 2019.
Gennadi Bersuker, et al.: "Metal Oxide RRAM Switching Mechanism Based on Conductive Filament Properties", Journal of Applied Physics 110(12):124518, Dec. 2012.
Tianqi Tang, et al.: "Spiking Neural Network with RRAM: Can We Use it for Real-World Application?", 2015 Design, Automation, and Test in Europe Conference & Exhibition, pp. 860-865, 2015.
Shayer, Oran, et al. "Learning Discrete Weights Using the Local Reparameterization Trick." Cornell University, Feb. 2, 2018.
Xia, Qiangfei, et al. "Memristive crossbar arrays for brain-inspired computing." Retrieved from the Internet on Jul. 29, 2022: <https://www.nature.com/articles/s41563-019-0291-x>, Mar. 20, 2019.
Shin, Sangho, et al., "Memristor-Based Fine Resolution Programmable Resistance and Its Applications." IEEE, 2009.

* cited by examiner

INTELLIGENT RADAR ELECTRONIC CONTROL UNITS IN AUTONOMOUS VEHICLES

FIELD OF THE TECHNOLOGY

At least some embodiments disclosed herein relate to radar in general and more particularly, but not limited to, radar electronic control units in autonomous vehicles.

BACKGROUND

Recent developments in the technological area of autonomous driving allow a computing system to operate, at least under some conditions, control elements of a motor vehicle without the assistance from a human operator of the vehicle.

For example, sensors (e.g., cameras and radars) can be installed on a motor vehicle to detect the conditions of the surroundings of the vehicle traveling on a roadway. A computing system installed on the vehicle analyzes the sensor inputs to identify the conditions and generate control signals or commands for the autonomous adjustments of the direction and/or speed of the vehicle, with or without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

Autonomous driving and/or Advanced Driver Assistance System (ADAS) can use an Artificial Neural Network (ANN) for the identification of events and/or objects that are captured in sensor inputs. Examples of sensor inputs include images from digital cameras, lidars, radars, ultrasound sonars, etc.

In general, an Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

A Spiking Neural Network (SNN) is a type of ANN that closely mimics natural neural networks. An SNN neuron produces a spike as output when the activation level of the neuron is sufficiently high. The activation level of an SNN neuron mimics the membrane potential of a natural neuron. The outputs/spikes of the SNN neurons can change the activation levels of other neurons that receive the outputs. The current activation level of an SNN neuron as a function of time is typically modeled using a differential equation and considered the state of the SNN neuron. Incoming spikes from other neurons can push the activation level of the neuron higher to reach a threshold for spiking. Once the neuron spikes, its activation level is reset. Before the spiking, the activation level of the SNN neuron can decay over time, as controlled by the differential equation. The element of time in the behavior of SNN neurons makes an SNN suitable for processing spatiotemporal data. The connectivity of SNN is often sparse, which is advantageous in reducing computational workload.

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
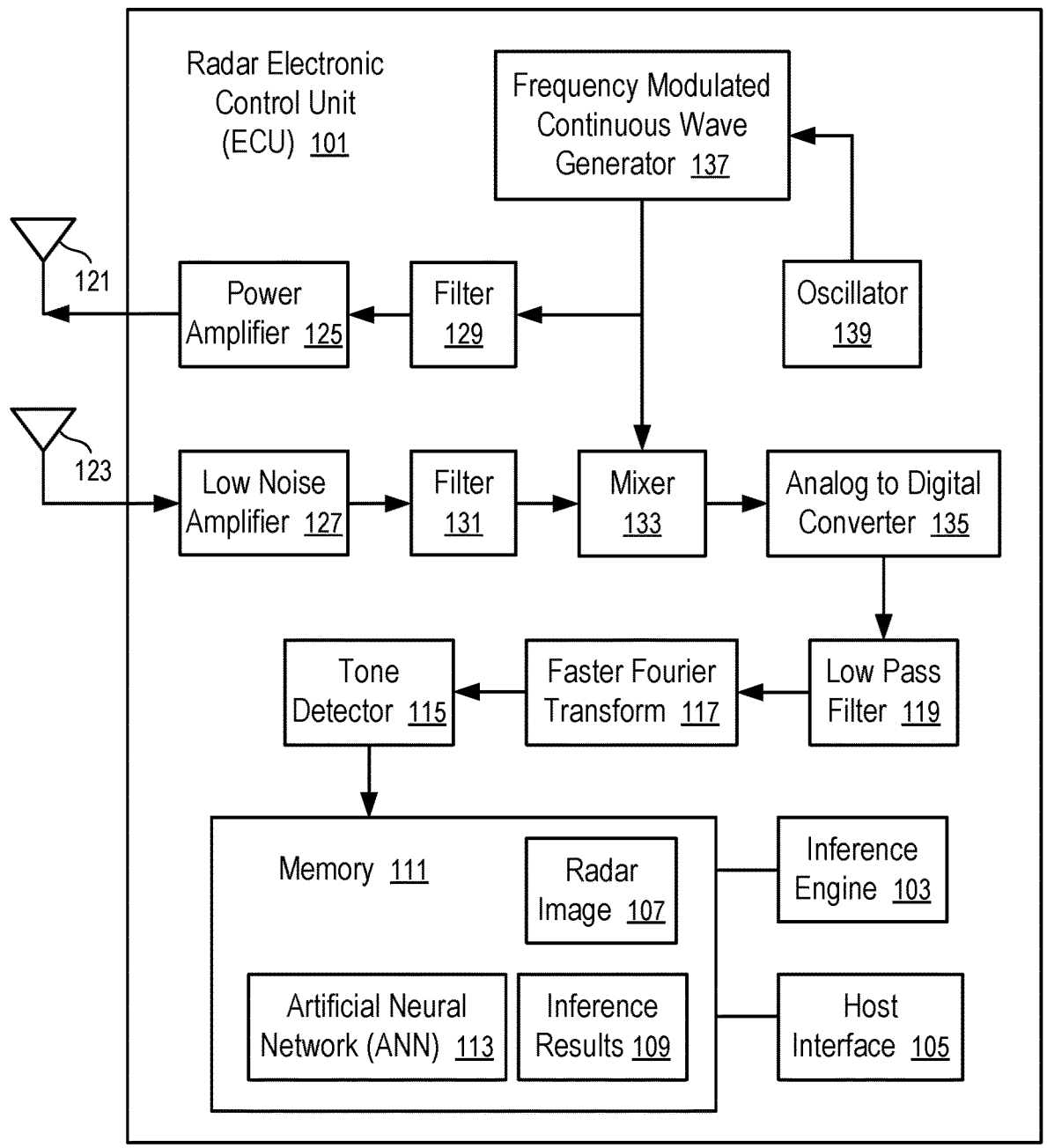
FIG. 1 shows a radar electronic control unit according to one embodiment.

At least some embodiments disclosed herein provide systems, methods and apparatus of intelligent radar electronic control units in a motor vehicle, or another vehicle, with or without an Advanced Driver Assistance System (ADAS).

For example, an Artificial Intelligence (AI) engine implemented using a neuromorphic memory device can be configured in a radar Electronic Control Unit (ECU). The AI engine can analyze the radar information to generate inference results for the host system (e.g., the ADAS of an autonomous vehicle). For example, the AI engine can process the radar image, extract a relevant portion of a radar image, and provide the extracted portion to the ADAS for sensor fusion. For example, the AI engine can process the radar image to identify characteristics of an object captured in the radar image and communicate the characteristics to the ADAS for further analysis and/or for adjustment of the control of the vehicle.

Radar can be used in an autonomous vehicle for obstacle avoidance, lane keeping, blind spot detection, rear collision warning, cross traffic alert, adaptive cruise control, etc. Radar can be used to determine the location of a vehicle on a road by comparing the radar image of the road as seen by the vehicle and a predetermined map radar detectable features of the road. Radar vision can supplement, or replace, camera vision in times of low visibility, like night driving, and improve obstacle detection for self-driving cars.

For example, radar can transmit radio waves in pulses. The radio wave pulses can be reflected by an object back to the radar to provide information on the distance and speed of the object relative to the radar. The radar can scan a portion of the three-dimensional space of its surrounding for objects by sending the radio wave pulses in different directions. Detection results from the scanning can form a radar image. The radar image can be analyzed using an artificial neural network to identify parameters of an object captured on the radar image, such as the size of the object, the distance of the object, the speed of the object, the object's ability to reflect the radio wave pulses of the radar, etc.

Instead of providing the radar image to the ADAS of the vehicle, a radar electronic control unit can have a neuromorphic memory device to perform an analysis of the radar image and generate inference results that are provided to the ADAS of the vehicle. The neuromorphic memory device can be used to implement a Deep Neural Network (DNN) or a Spiking Neural Network to analyze the 3-dimensional maps of radar information (e.g., locations of points of reflections of radar pulses and the speeds of the points of locations relative to the vehicle). The analysis results of the DNN or SNN can be sent to the ADAS of the vehicle for sensor fusion, for further analysis, and/or for driving decision making. Such an arrangement can substantially reduce the amount of data to be transferred to, and analyzed by, the processor(s) of the ADAS. For example, when the radar information is locally converted at the radar ECU into inference results using the DNN or SNN, the radar ECU can generate the 3-dimensional maps of radar information at a resolution and frame rate that exceeds the communication bandwidth supported by a standardized communication line between the radar ECU and the processor(s) of the ADAS. The improved resolution and frame rate can lead to better and safer autonomous driving capability.

FIG. 1 shows a radar Electronic Control Unit (ECU) (101) according to one embodiment.

In FIG. 1, the radar ECU (101) includes a frequency modulated continuous wave generator (137) that is configured to modulate the signals from the oscillator (139). A power amplifier (125) amplifies the Frequency Modulated Continuous Wave (FMCVV) passing through a filter (129) for transmission via a transmission antenna (121). When the FMCW emitted from the antenna (121) is reflected by an object, the reflected FMCW is receive at a receiving antenna (123). A low noise amplifier (127) amplifies the signals from the receiving antenna (123); and the filter (131) allows the reflected and amplified FMCW to enter a mixer (133). The mixer (133) combines FMCW from the generator (137) and the amplified FMCW from the receiving antenna (123). An analog to digital converter (135) converts the results of the mixer (133) into digital signals. A low pass filter (119) is configured to block the high frequency signals that have the frequency of signals from the oscillator (139) or higher. The output of the low pass filter (119) provides a beat signal resulting from mixing the FMCW from the generator (137) for transmission and the FMCW from the receiving antenna (123). A faster Fourier transform (117) is performed to allow a tone detector (115) to determine the frequency of the beat signal. A beat signal frequency can be used to determine the Doppler shift in the reflected FMCW received in the antenna (123) and thus the relative speed of the object reflecting the FMCW and the receiving antenna (123). Further, a delay between the transmitted FMCW and the received FMCW can be used to determine the round-trip distance from the transmission antenna, to the object reflecting the FMCW, and back to the receiving antenna (123).

The speed of, and the distance to, a point of reflection of the FMCW provide the radar information of a pixel of the radar image (107) corresponding to a direction of transmission of the FMCW. Different directions of the transmission of the FMCW can provide radar information of different pixels of the radar image (107). The collections of the speed and/or distance of the points of reflection of the FMCW provide the radar image (107).

In FIG. 1, the radar image (107) is stored in memory (111) of the radar ECU (101) in a cyclic way, where the newest radar image (107) is written over the oldest radar image (107). Further, the memory (111) of the radar ECU (101) stores an Artificial Neural Network (ANN) (113). An inference engine (103) of the radar ECU (101) is configured to apply the ANN (113) on the radar image (107) to generate inference results (109). A host interface (105) is configured to provide the inference results (109) to a host system, such as a computer of a vehicle implementing an ADAS for autonomous driving.

For example, the inference result (109) can include the identification of an object captured in the radar image (107), the location and speed of the object relative to the radar ECU (101), the size of the object, one or more classification of the object, and/or an extracted portion of the radar image (107) that shows the object.

The memory (111) can be implemented using integrated circuit memory. In general, some memory integrated circuits are volatile and require power to maintain the stored data; and some memory integrated circuits are non-volatile and can retain the stored data even when not powered. The memory (111) can include volatile memory and/or non-volatile memory. The memory (111) can be implemented using different types of memory or a same type of memory.

Examples of non-volatile memory include flash memory, memory units formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two lays of wires running in perpendicular directions, where wires of one lay run in one direction in the layer is located above the memory element columns, and wires of the other lay is in another direction and in the layer located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

The inference engine (103) can include a neural network accelerator can be configured to perform matrix arithmetic computations more efficiently than a general purpose processing device (e.g., a controller or a Central Processing Unit (CPU)). Optionally, the inference engine (103) also includes one or more generic processor. The computations involving ANN (113) have matrix arithmetic computations, such as matrix multiplication and accumulation operations, which can be computational intensive for a generic processor. Using the neural network accelerator to perform the matrix arithmetic computations can reduce the data to be transmitted to the processor(s) and reduce the computation workload for the processor(s).

When the ANN (113) includes a Spiking Neural Network (SNN), the simulation of the differential equation(s) for controlling the activation level of SNN neurons can be computationally intensive for a generic processor. Optionally, the neural network accelerator can use special hardware to simulate the differential equation(s) and thus improve the computational efficiency in implementing the SNN.

Figure 2:
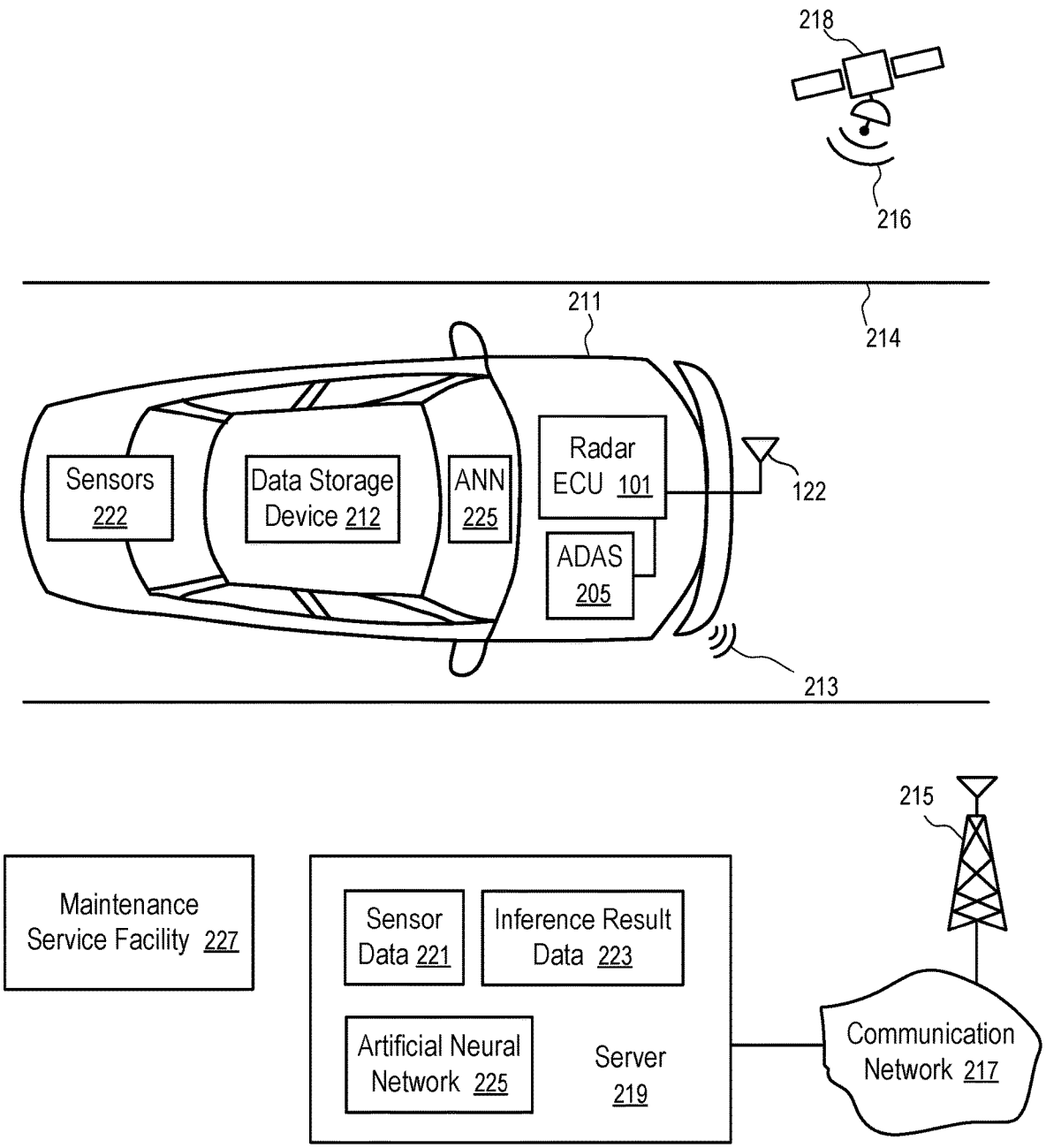
FIG. 2 shows a system having a vehicle configured to collect and process sensor data according to some embodiments.

For example, the radar ECU (101) can be configured in a vehicle illustrated in FIG. 2.

FIG. 2 shows a system having a vehicle (211) configured to collect and process sensor data according to some embodiments.

The vehicle (211) in FIG. 2 has a radar ECU (101), a data storage device (212), sensors (222), an ANN (225), and an ADAS (205) configured to process sensor data, including inputs from the sensors (222), to generate control signals for the vehicle (211).

In general, one or more sensors (e.g., 222) can be configured on the vehicle (211) to generate senor data input to the ADAS (205) and/or the data storage device (212). The radar ECU (101), the data storage device (212), and/or the ADAS (205) can be configured to use the ANN (225) to generate inference results. The inference results can include a control signal for operating or driving the vehicle (211), a suggestion for a maintenance service of the vehicle (211), etc.

In some implementations, at least a portion of the data generate by the sensors (e.g., 222) is used in both the ADAS (205) for driver assistance and in the ANN (225) for maintenance prediction. Optionally, the output of the ANN (225) can be used in both the data storage device (212) and in the ADAS (205). The ANN (225) can be part of the ADAS (205).

The sensors (222) can be configured in a digital camera, lidar, ultrasound sonar, etc. Other types of sensors can also be used, such as brake sensors, speed sensors, acceleration sensors, airbag sensors, a GPS (global positioning system) receiver, audio sensors/microphones, vibration sensors, force/stress sensors, deformation sensors, motion sensors, temperature sensors, etc. Some of the sensors (222) can be configured primarily to monitor the environment of the vehicle (211); and other sensors (222) can be configured primarily to monitor the operating condition of one or more component of the vehicle (211), such as an internal combustion engine, an exhaust system, an electric motor, a brake, a tire, a battery, etc.

The ANN (225) of the vehicle (211) is configured to process the sensor input data from the sensors (222) and/or the radar ECU (101) to control the vehicle (211).

In general, the outputs of the sensor(s) (222) and/or the radar ECU (101) as a function of time are provided as a sensor data stream to the ADAS (205) and/or the ANN (225) to provide driver assistance (e.g., autonomous driving) and maintenance prediction.

At least a portion of the sensor data stream can be provided to the data storage device (212) for storing and/or for processing. For example, a portion of the ANN (225) can be implemented in the data storage device (212). An inference engine of the data storage device (212) can process the sensor data stream to generate inference results for further processing by the ADAS (205). Thus, the input data stream to the data storage device (212) can include at least a portion of the sensor data stream from the sensors (222); and the output data stream from the data storage device (212) can include inference results generated using the ANN (225) in the data storage device (212) for the ADAS (205) of the vehicle (211).

At least a portion of the ANN (225) relevant to the radar image (107) generated in the radar ECU (101) can be implemented as the ANN (113) and via the inference engine (103) of the radar ECU (101). Optionally, some sensor data generated by the sensors (222) and/or inference results generated by the data storage device (212) and/or the ADAS (205) can be provided to the radar ECU (101) for sensor fusion and/or reduce the data traffic among the communication connections in the vehicle (211).

The ANN (225) of the vehicle (211), in the data storage device (212), and/or in the radar ECU (101) can include an SNN configured to classify time-based variations of sensor data and/or detect deviation from known patterns of sensor data of the vehicle (211). When the ANN (225) detects the deviation from known patterns, the sensor data corresponding to the deviation can be stored in the data storage device (212) and/or in the memory (111) of the radar ECU (101) for further analysis and/or for further training of the ANN (225).

The data storage device (212) of the vehicle (211) can be configured to record sensor data for a period of time that can be used in the ANN (225) for predictive maintenance and/or used to further train the ANN (225). The maintenance service facility (e.g., 227) can download the sensor data (221) from the data storage device (212) and provide the sensor data (221) and the corresponding inference result data (223) to the server (219) to facilitate the training of the ANN (225).

Optionally, or in combination, the data storage device (212) and/or the radar ECU (101) can be configured with a machine learning module to customize and/or train the ANN (225) installed in the vehicle (211) and/or in the data storage device (212).

The vehicle (211) can have a wireless communication device to communicate with a remote server (219) via wireless signals (213) and a communication network (217). The remote server (219) is typically configured at a location away from a road (214) on which the vehicle (211) is in service. For example, the vehicle (211) may provide some sensor data (221) to the server (219) and receive update of the ANN (225) from the server (219).

The communication network (217) can be a cellular phone network having one or more base stations (e.g., 215) to receive the wireless signals (e.g., 213). Alternatively, or in combination, the communication network (217) can include the Internet, where the wireless local area network signals (e.g., 213) transmitted by the vehicle (213) is received in an access point (e.g., 215) for further communication to the server (219). In some implementations, the vehicle (211) uses a communication link (216) to a satellite (218) or a communication balloon to communicate with the server (219).

The server (219) can also communicate with one or more maintenance service facilities (e.g., 227) to receive the sensor data (221) and/or the desired inference result data (223) of vehicles (e.g., 211).

For example, the desired inference result data (223) can be generated by a human operator inspecting the sensor data (221) (e.g., radar images from the radar ECU (101), inputs from the sensors (222)) and/or relevant conditions of the vehicle (211). For example, the desired inference result data (223) can include inspection records and/or service records of components of the vehicles (e.g., 211). For example, the inspection records and/or service records can indicate the degree of wear and tear of components inspected during their services at the maintenance service facilities (e.g., 227), the identification of failed or malfunctioning components, etc. The sensor data (221) of the vehicles (e.g., 211) obtained in a time period relevant to the desired inference result data (223) can be used to train an ANN (225) at the server (219) to improve inference capability of the ANN (225).

The updated ANN (225) can be installed in the vehicle (211) at the maintenance service facility (227). Alternatively, the update ANN (225) can be transmitted to the vehicle (211) to update the vehicle (211) over the air.

A portion of the ANN (225) responsible for the processing of radar image (107) and/or for sensor fusion based on the radar image (107) can be configured in the radar ECU (101). The inference engine (103) of the radar ECU (101) processes the radar image (107) and, optionally, inputs from the sensors (222) to generate the inference results (109). Based on the input from the sensors (222) and/or the inference results (109) from the radar ECU (101), the ADAS (205) of the vehicle (211) can generate controls for autonomous driving of the vehicle (211) and/or driver assistance.

Figure 3:
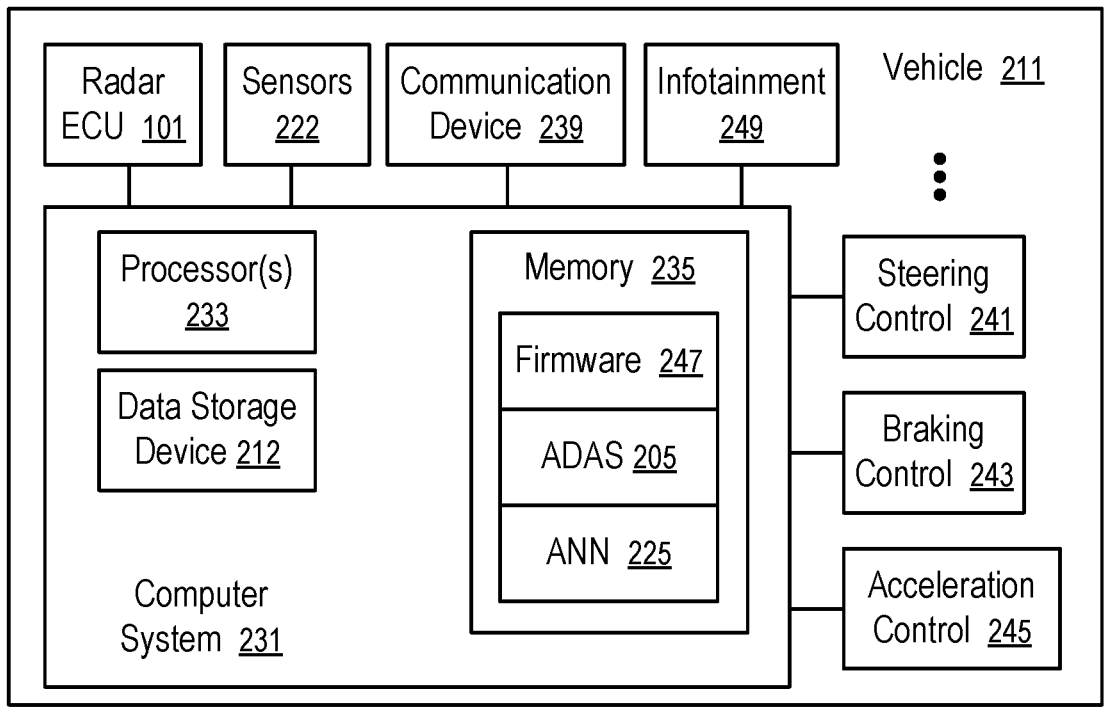
FIG. 3 shows an autonomous vehicle according to one embodiment.

FIG. 3 shows an autonomous vehicle (211) according to one embodiment.

For example, the vehicle (211) in the system of FIG. 2 can be implemented using the autonomous vehicle (211) of FIG. 3.

In general, the vehicle (211) can include an infotainment system (249), a communication device (239), one or more sensors (222), a radar ECU (101), and a computer system (231) that is connected to some controls of the vehicle (211), such as a steering control (241) for the direction of the vehicle (211), a braking control (243) for stopping of the vehicle (211), an acceleration control (245) for the speed of the vehicle (211), etc. In some embodiments, the vehicle (211) in the system of FIG. 2 has a similar configuration and/or similar components.

The vehicle (211) of FIG. 3 is configured with an Advanced Driver Assistance System (ADAS) (205). The ADAS (205) of the vehicle (211) can have an Artificial Neural Network (ANN) (225) for object detection, recognition, identification, and/or classification, based on images generated in the sensors (222). A portion of the ANN (225) can be implemented in the radar ECU (101) of FIG. 1 and/or in the data storage device (212) of FIG. 2.

The computer system (231) of the vehicle (211) can include one or more processors (233), a data storage device (212), and memory (235) storing firmware (or software) (247), including the computer instructions and data models for ADAS (205).

Sensors (222) of the vehicle (211) can include a visible light camera, an infrared camera, a lidar, or sonar system, a peripheral sensor, a Global Positioning System (GPS) receiver, a satellite positioning system receiver, a brake sensor, and/or an airbag sensor. Further, the sensors (222) of the vehicle (211) can include audio sensors (e.g., microphone) configured to monitor noises from various components and locations in the vehicle (211), a vibration sensor, a pressure sensor, a force sensor, a stress sensor, and/or a deformation sensor configured to measure loads on a component of the vehicle (211), accelerometers and/or gyroscope sensors measuring the motions of some components of the vehicle (211), etc. Such sensors can be used to monitor the operating status and/or health of the components for predictive maintenance.

The sensors (222) and the radar ECU (101) can provide a stream of real time sensor data to the computer system (231). For example, the sensor data generated for the vehicle (211) can include an image that captures an object using a camera that images using lights visible to human eyes, or a camera that images using infrared lights, or a sonar, radar, or LIDAR system. Preferably, at least the radar image (107) is processed by the inference engine (103) of the radar ECU (101) to generate inference results as the output data of the radar ECU (101) and thus reduce the computation workload of and the data traffic to the main computer system (231).

For example, the radar ECU (101) can generate the radar image (107) at a resolution and frequency that exceeds the communication bandwidth between the radar ECU (101) and the computer system (231). However, since the inference engine (103) of the radar ECU (101) reduces the radar image (107) to inference results (109) that has a data volume much smaller than the radar image (107), the inference results (109) can be transmitted from the radar ECU (101) and the computer system (231) using the limited communication bandwidth between the radar ECU (101) and the computer system (231).

For example, the radar image (107) can include features of subterranean fingerprint of the roadway ahead of the vehicle; and the inference results (109) can include the identification of the features and their locations relative to the vehicle (211). The ADAS (205) is configured to compare the features and their locations to a map to determine the location of the vehicle (211) on the roadway for lane keeping. Optionally, a map of the subterranean fingerprint of the roadway can be stored in the radar ECU (101); and the inference engine (103) and the ANN (113) are configured to determine the location of the vehicle (211) on the roadway. During autonomous driving, the ADAS (205) can provide adjustments to the steering control (241) to drive within a lane. Alternatively, when the ADAS (205) detects the vehicle (211) drifting out of a lane, the ADAS can provide an alert to the driver of the vehicle (211).

The infotainment system (249) of the vehicle (211) can be used to present data and/or inference results from the radar ECU (101). For example, compressed radio images with reduced resolution and refreshing frequency can be generated in radar ECU (101) and transmitted to the infotainment system (249) for presentation as an overlap on the map of the subterranean fingerprint of the roadway. Optionally, the communication device (239) can establish a connection to a mobile device of an occupant of the vehicle (211) to make the presentation.

When the vehicle (211) is configured with an ADAS (205), the outputs of the ADAS (205) can be used to control (e.g., 241, 243, 245) the acceleration of the vehicle (211), the speed of the vehicle (211), and/or the direction of the vehicle (211), during autonomous driving.

The memory capacity of the radar ECU (101) can be partitioned into different portions for the different types of ANN-related data. The different portions can be separately configured to optimize the access and storage of the corresponding data according to their patterns of usages by the inference engine (103).

The model of the Artificial Neural Network (ANN) (113) can include the parameters specifying the static attributes of individual artificial neurons in the ANN (113) and the neuron connectivity in the ANN (113). The model data of the ANN (113) is static and does not change during the prediction calculation made using the ANN (113). Thus, the usage pattern of the model data is mostly read. However, the model data of the ANN (113) can change when an updated ANN (113) is installed. For example, the vehicle (211) can download an updated ANN (113) from the server (219) to the data storage device (212) of the vehicle (211) to update its prediction capability. The model data of the ANN (113) can also change during or after the training of the ANN (113) using a machine learning technique (e.g., 271 or 275). It is preferred to configure a memory separate partition or region of the data storage device (212) to store the model data, where the partition or region is operated according to configuration parameters that optimize the memory units for the specific usage patterns of the model data (e.g., mostly read, infrequent update). For example, when the memory units are implemented using a flash memory based on NAND logic gates, the memory units in the ANN model partition/region can be configured to operate in a Multi-Level Cell (MLC) mode, a Triple Level Cell (TLC) mode, or a Quad-Level Cell (QLC) mode, wherein each memory cells stores two, three, or four bits for increased storage capability.

Input data provided to the artificial neurons in the ANN (113) can include external inputs and internal inputs. The external inputs are generated typically by the sensors (e.g., 209) of the vehicle (211) but not by artificial neurons in the ANN (113). The external inputs can be saved in a cyclic fashion so that the input data of the most recent time period of a predetermined length of driving can be found in the data storage device (212). Thus, it is preferred to configure a separate memory partition or region of the data storage device (212) to store the external input data, where the partition or region is operated according to configuration parameters that optimize the memory units for the storage pattern of the external input data (e.g., enhanced endurance, cyclic overwrite). For example, when the memory units are implemented using a flash memory based on NAND logic gates, the memory units in the ANN input partition/region can be configured to operate in a Single Level Cell (SLC) mode, where each memory cell stores one bit of data for improved endurance in cyclic overwriting operations.

In some implementations, artificial neurons can have state variables that change over time in response to inputs during prediction calculations. For example, the activation level of a spiking neuron can change over time and is considered a dynamic state variable of the spiking neuron. In some implementations, such state variable data of artificial neurons has a similar storage usage pattern as the external input data; and thus, the state variable data can be stored in the partition or region configured for the external input data. In other implementations, the state variable data of artificial neurons is kept in a buffer and stored less frequently than the external inputs; and thus, another partition/region can be configured for storing the dynamic state variable data of artificial neurons.

Output data generated by the artificial neurons in the ANN (113) can be buffered for further access by the inference engine (101) and/or the processor(s) (233) of the computer system (231). The output data can include external outputs and internal outputs. The external inputs are generated by artificial neurons as the output from the ANN (113), such as the results of classifications or predictions made by the ANN (113). The output of the ANN (113) is typically further processed by the processor(s) (233) of the computer system (231). The external inputs may be saved periodically (e.g., in a way similar to the storing of the state variable data). The internal outputs and/or some of the external outputs can be internal inputs to artificial neurons in the ANN (113). In general, it may not be necessary to store the internal outputs from the buffer of the data storage device to the memory components. In some implementations, when the buffer capability of the radar ECU (101) is insufficient to hold the entire state variable data and/or the internal outputs, the radar ECU (101) can use a swap partition/region to extend the capacity of the buffer. The swap partition/region can be configured for optimized random access and for improved endurance.

External outputs and/or dynamic states of neurons can be saved in a separate output partition or region, in a cyclic way so that the external output data and/or dynamic states of the neurons can be periodically stored, and the most recent sets of the external outputs and/or dynamic states can be found in the radar ECU (101). External outputs and/or dynamic states of neurons can be stored selectively, since some of such data can be re-generated by the ANN from the external inputs stored in the input partition or region. Preferably, the output partition or region is configured to store one or more sets of external outputs and/or dynamic states that cannot be created from the external inputs stored in the input partition or region. In storing data in a cyclic way in an input/output partition or region, the oldest stored data sets are erased to make rooms for the most recent data sets. The ANN input/output partition/region can be configured for an optimized sequential write stream for copying data from the buffer of the data storage device into the memory units in the memory components of the data storage device.

Figure 4:
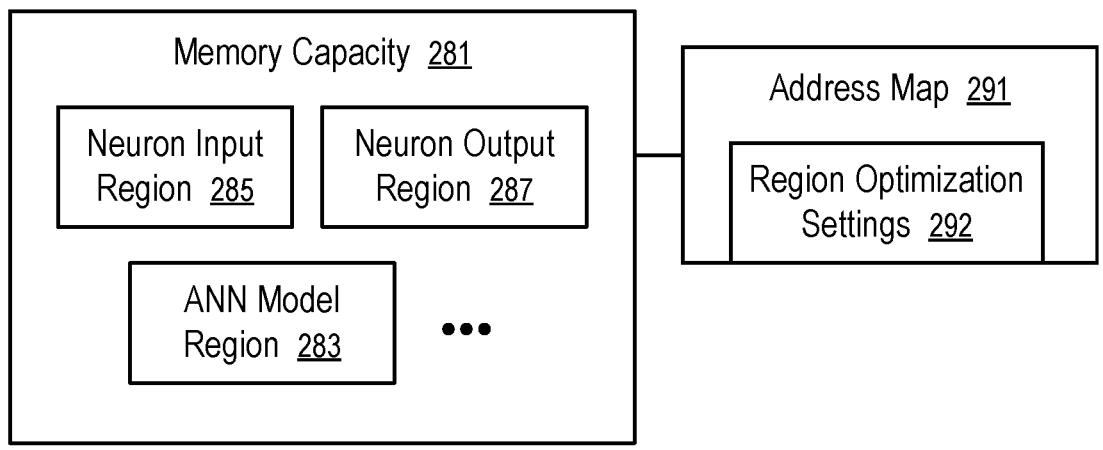
FIG. 4 shows a memory capacity configured to support neural network computations according to one embodiment.

FIG. 4 shows a memory capacity (281) configured to support neural network computations according to one embodiment. For example, the memory capacity (281) of the memory (111) of the radar ECU (101) of FIG. 1 can be configured according to FIG. 4 to support neural network computations. For example, the memory capacity (281) of the data storage device (212) can be configured according to FIG. 4 to support neural network computations.

The storage capacity (281) of FIG. 4 can be implemented using one or more memory components, each configured in an integrated circuit and/or on an integrated circuit die.

A set of regions (283, 285, 287, . . . ) can be created on the memory capacity (281). Each of the region (e.g., 283, 285, or 287) corresponds to a named portion of the memory capacity (281). Logical addresses are defined within each region. An address map (291) is configured to map between the logical addresses defined in the regions (283, 285, 287, . . . ) to the physical addresses of memory units in the memory components.

The address map (291) can include region optimization settings (292) for the regions (283, 285, and 287).

For example, an ANN model region (283) can be a memory/storage partition configured for the model data of the Artificial Neural Network (ANN) (113). The region optimization settings (292) optimizes the memory operations in the ANN model region (283) according to the data usage pattern of ANN models (e.g., mostly read, infrequent update centric).

For example, a neuron input region (285) can be a memory/storage partition configured for the external input data to the Artificial Neural Network (ANN) (113). The region optimization settings (292) optimizes the memory operations in the neuron input region (285) according to the data usage pattern of the external input data (e.g., for enhanced endurance supporting cyclic overwrite of continuous input data flow for sequential writes).

For example, a neuron output region (287) can be a memory/storage partition/configured for the external output data provided from the Artificial Neural Network (ANN) (113). The region optimization settings (292) optimizes the memory operations in the neuron output region (287) according to the data usage pattern of the external output data (e.g., improved endurance for periodically overwrite of data with random read/write access).

A buffer (e.g., 252 in FIG. 5) be configured to store temporary/intermediate data of the Artificial Neural Network (ANN) (113), such as the internal inputs/outputs of the artificial neurons in the ANN (113).

Figure 5:
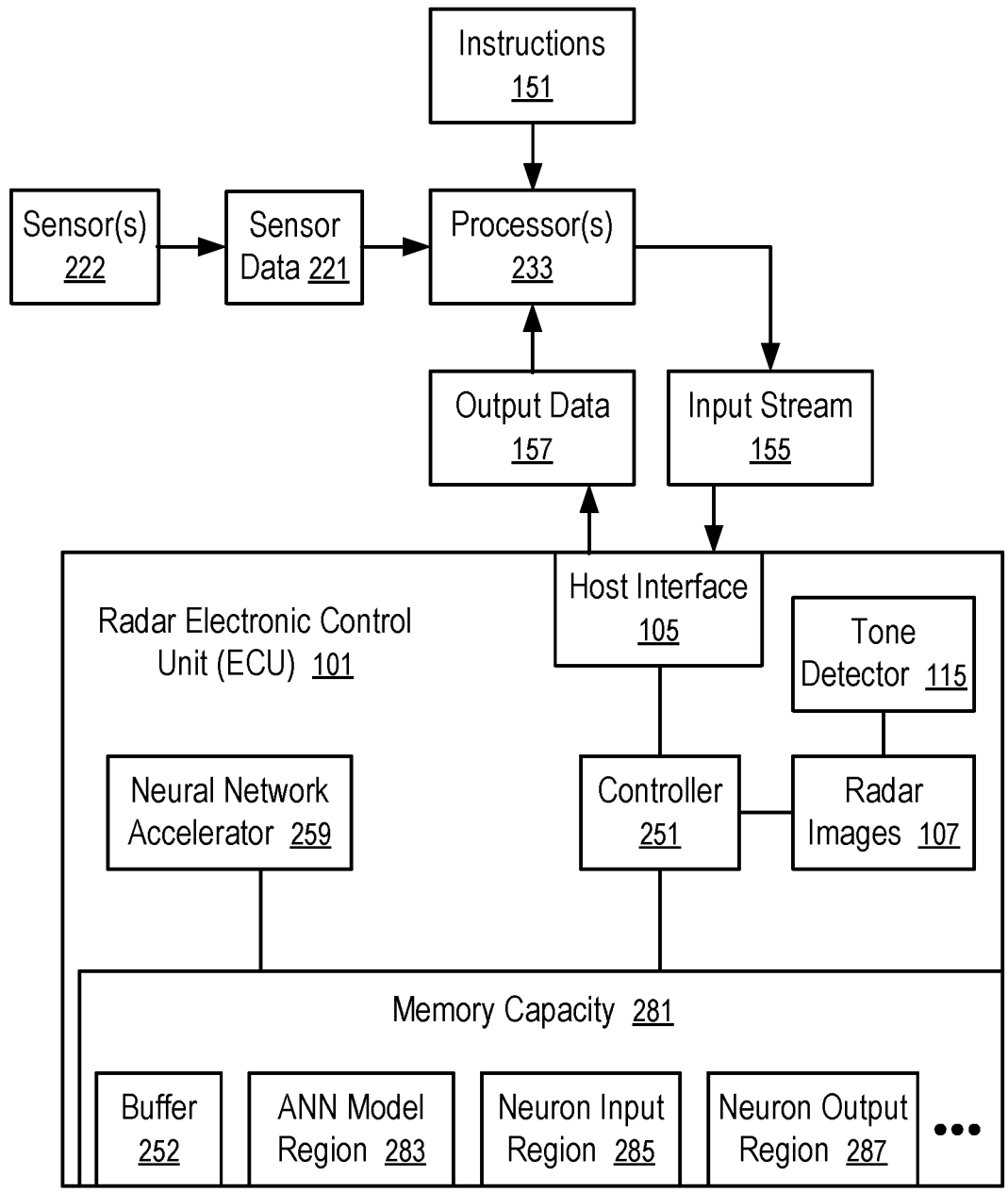
FIG. 5 shows communications between an autonomous vehicle and a radar electronic control unit according to one embodiment.

Optionally, a swap region can be configured in the memory capacity (281) to extend the capacity of the buffer (e.g., 252 in FIG. 5).

Optionally, the address map (291) includes a mapping between logic memory addresses received in the host interface (105) to access data of artificial neurons and the identities of the artificial neurons. Thus, a read or write command to access one type of data of an artificial neuron in one region can cause the controller (e.g., 251 in FIG. 5) to access another type of data of the artificial neuron in another region.

For example, in response to a request to write external input data for a neuron into the memory capacity (281), the address map (291) can be used to calculate the addresses of the model parameters of the neuron in the ANN model region (283) and read the model parameters into the buffer (252) to allow the inference engine (103) to perform the computation of the output of the neuron. The output of the neuron can be saved in the buffer (252) as the internal input to other neurons (e.g., to reduce write amplification). Further, the identities of the other neurons connected to the neuron can also be retrieved from the ANN model region (283) into the buffer (252), which allows the inference engine (103) and/or the processor to further process the propagation of the output in the ANN (113). The retrieval of the model data from the ANN model region (283) can be performed in parallel with the storing of the external input data into the neuron input region (285). Thus, the processors (233) of the computer system (231) of the vehicle (211) do not have to explicitly send in read commands for the retrieval of the model data from the ANN model region (283).

Similarly, in response to reading output data of a neuron, the address map (291) can be used to compute the addresses of the model parameters of the neuron stored in the ANN model region (283) and read the model parameters into the buffer (252) to allow the inference engine (103) to apply internal inputs in the buffer (252) to the perform the computation of the output of the neuron. The computed output can be provided as a response to the reading of the output data for the neuron, without the radar ECU (101) having to store the output data in the memory components. Thus, the processors (233) and/or the inference engine (103) can control the computations of the neuron via writing inputs to neurons and/or reading outputs from neurons.

In general, incoming external input data to the ANN (113) can be raw sensor data (221) generated directly by the sensors (e.g., 209) without processing by the processors (233) and/or the inference engine (103). Alternatively, indirect sensor data (221) that has processed by the processors (233) for the ANN (113) from the signals from the sensors (222) can be provided as the external input data. The incoming external input data can be accepted in the host interface (105) and written in a cyclic way into the neuron input region (285), and automatically buffered in the buffer (252) for inference engine (103) to generate neuron outputs using the model stored in the ANN model region (283). The outputs generated by the inference engine (103) can be further buffered as internal inputs for further application of the model in the ANN model region (283). When the external outputs become available, the controller (251) can report the completion of the write requests with an indication of the availability of the external outputs. Optionally, the controller 251 and/or the inference engine (103) can generate internal read commands to propagate signals in the ANN (113) in generating the external outputs. Alternatively, the host processors (233) can control the propagation of signals in the ANN (113) by selectively reading outputs of neurons; and the data storage device (212) can actively buffer data that may be needed in the buffer (252) to accelerate the ANN computation.

A communication protocol/interface can be configured to allow radar ECU to perform neural network acceleration on the fly with reduced data traffic to the host system.

For example, the host processor (e.g., 233) of a vehicle (211) can provide write commands to the radar ECU (101) to store the model of an artificial neural network in a model partition (e.g., 283).

To use the ANN model in classifications and/or predictions, the host processor (e.g., 233) of a vehicle (211) can optionally stream input data for the ANN (113) into the neuron input partition (e.g., 285). The inference engine (103) can automatically apply the radio images (107) from the tone detector (115) and, if there is any, the input data from the host processor (233) to the model stored in ANN model partition (e.g., 283) in accordance with the address map (291). The radar ECU (101) makes the computed outputs available for propagation in the ANN (113). Preferably, the computed outputs are made available to the inference engine (103) through the buffer (252) without the need to store the intermediate outputs into memory components (e.g., 261 to 263). Thus, the data communications between the host processor (e.g., 233) and the radar ECU (101) for the transporting of outputs of neurons can be reduced. When the outputs have propagated to the output neurons in the ANN (113), the radar ECU (101) can provide a response to a request from the host processor (e.g., 233). The response indicates that the external output from neurons in the ANN (113) is available. In response, the host processor (e.g., 233) of a vehicle (211) can optionally issue read commands to retrieve the external outputs for further processing.

FIG. 5 shows communications between an autonomous vehicle (211) and a radar electronic control unit (101) according to one embodiment. For example, the communications as illustrated in FIG. 5 can be implemented in the vehicle (211) of FIG. 2 or 3, with a radar ECU (101) illustrated in FIG. 1.

In FIG. 5, the processor(s) (233) of the host system (e.g., 231) can be configured with a simplified set of instructions (151) to perform neural network computation, since some of the computations involving the ANN (225) is performed by the inference engine (103) or neural network accelerator (259) within the radar ECU (101).

The sensors (222) of the vehicle (211) can generate an optional continuous input stream (155) as part of sensor data (221) for radar ECU (101) of the vehicle (211). The sensor data (221) in the input stream (155) can be generated at a fixed, predetermined time interval (e.g., during the operation of the vehicle (211)) for sensor fusion in the radar ECU (101). Alternatively, the operations of sensor fusion can be performed by the processors (233).

The tone detector (115) of the radar ECU (101) generates a stream of radar images (107). The radar images (107) and the optional input stream (155) are applied to input neurons in the ANN (113) stored in the ANN model region (283). Input neurons in the ANN (113) are configured to accept external inputs to the ANN (113); and output neurons are configured to provide external outputs from the ANN (113).

The processor(s) (233) can execute the instructions (151) to process some of the sensor data (221) and the output data (157) from the neuron output region (287) of the radar ECU (101).

For example, the processor(s) (233) can write the sensor data (221) as part of the input stream (155) into the neuron input region (285) and read from the neuron output region (287) the output data (157) generated by the inference engine (103) using the ANN data in the model region (283).

The radar ECU (101) stores the input stream (155) into the neuron input region (285) in a cyclic way where the oldest input set corresponding to the oldest time instance of data sampling for data sets currently stored in the neuron input region (285) is erased to store the newest set of inputs.

For each input data set, the inference engine (103) applies the model of the ANN (113) stored in the ANN model region (283). The inference engine (103) (or the processor(s) (233)) can control the propagation of signals within the neural network. When the output neurons of the ANN (113) generate their outputs responsive to the input data set, the radar ECU (101) can provide to the processor (233) an indication that the neuron outputs are ready for retrieval. The indication can be configured in a response to the request from the processor(s) (233) to write the input data set into the neuron input region (285). The processor(s) (233) can optionally retrieve the output data (157) (e.g., in accordance with conditions and/or criteria programmed in the instructions).

In some embodiments, a trigger parameter is configured in the radar ECU (101). When an output parameter in the external output (167) meetings a requirement specified by the trigger parameter, the radar ECU (101) provides the response to the request from the processor(s) (233) to write the input data set into the neuron input region (285).

Figure 6:
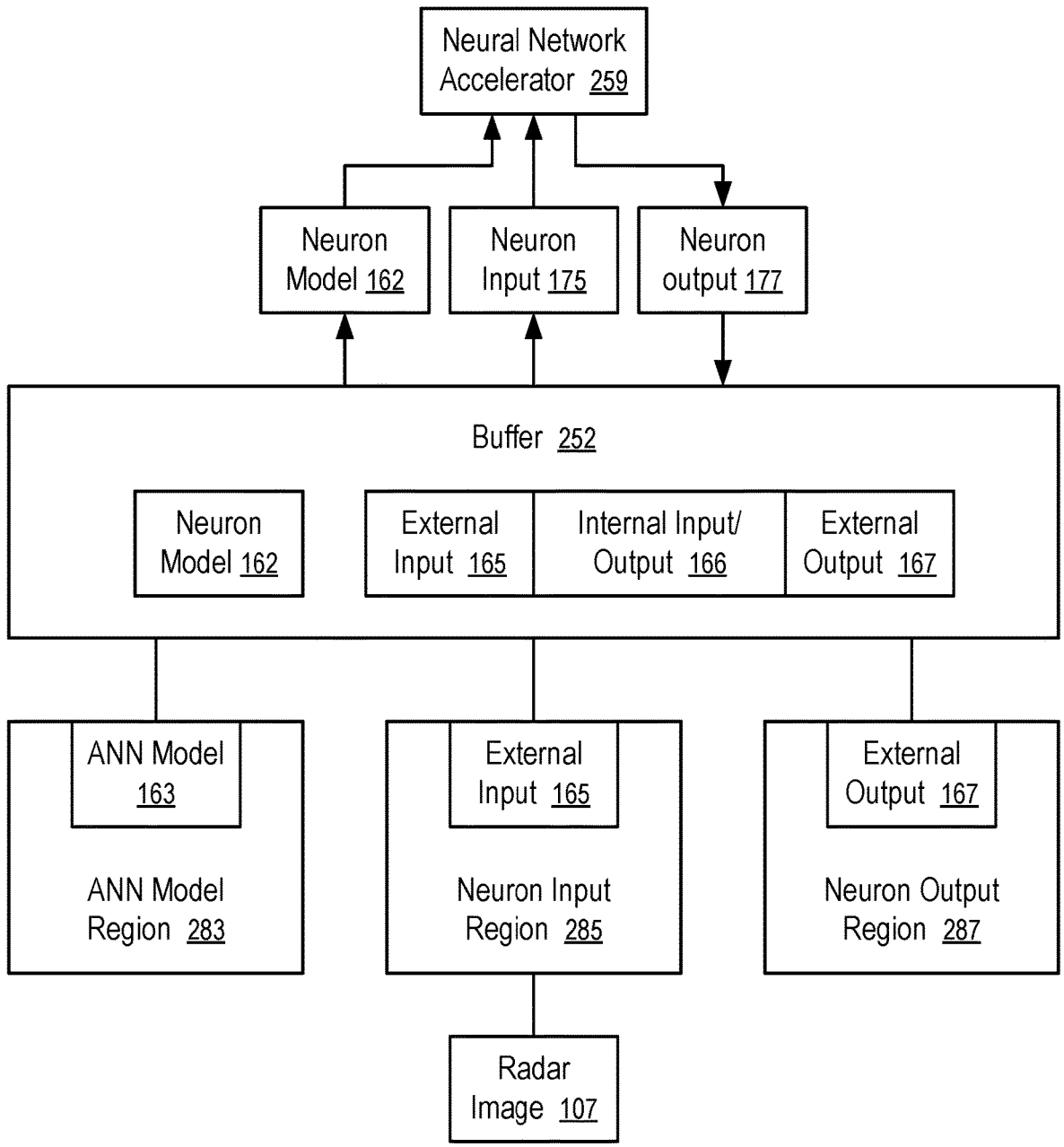
FIG. 6 shows communications within a radar electronic control unit according to one embodiment.

FIG. 6 shows communications within a radar electronic control unit (101) according to one embodiment. For example, the communications of FIG. 6 can be implemented a radar ECU (101) illustrated in FIG. 1.

In FIG. 6, the model region (283) stores the model (163) of an ANN (113). In response to receiving the radar images (107) and an optional set of external input (165) for a time instance from the input stream (155) in the buffer (252), the data storage device (212) can write the external input (165) into the input region (285) in parallel with retrieving a neuron model (162) containing a portion of the ANN model (163) corresponding to the parameters of the input neurons and/or the identities of neurons connected to the input neurons. The buffer (252) allows the inference engine (103) to combine the neuron model (162), the radar image (107), and the optional external input (175) to generate the output (177) of the input neurons.

In general, the neuron output (177) can include a portion that is the internal output (166) for further propagation within the ANN (113) and/or a portion that is the external output (167) for the processor(s) (233).

The internal output (166) is stored in the buffer (252) as internal input (166) for further propagation in the ANN (113) in a way similar to the generation of neuron outputs (177) from the external input (165). For example, a portion of the internal input (166) can cause the controller (251) and/or the inference engine (103) to retrieve corresponding neuron model (162) relevant to the internal input such that the internal input is applied in the inference engine (103) to the corresponding neuron model (162) to generate their neuron outputs (177).

When the complete set of the external output (167) is available in the buffer (252), the external output (167) can be stored into the output region (287).

Optionally, the radar ECU (101) (or the storage device (212)) does not store each set of external output (167) corresponding to a set of stored external input (165) sampled at a time instance. For example, the radar ECU (101) (or the storage device (212)) can be configured to store one set of external output (167) every time when a predetermined number of sets of external input (e.g., 165) has been counted. Alternatively, or in combination, the processor(s) (233) can determine whether or not to store the external output (167). For example, the radar ECU (101) can be configured to store the external output (167) in response to the processor(s) (233) retrieving the external output (167) for further processing. For example, the lidar sensor (101) (or the storage device (212)) can be configured to store the external output (167) in response to a write command from the processor(s) (233) after the processing of the external output (167) in the processor(s) (233).

The inference engine (103) and/or the neural network accelerator (259) can be configured to implement and/or accelerate a spiking neural network using one or more memristor crossbar arrays.

Resistive Random-Access Memory (ReRAM or RRAM) works by changing the resistance across a dielectric solid-state material, which can be referred to as a memristor. In general, a memristor is a two-terminal electrical component that has a non-constant electrical resistance. Its resistance can change based on the history of current flowing through the memristor and/or the history of voltage applied on the memristor. The memristor can remember its recent resistance when the power supply to the memristor is turned off. Thus, the memristor can be used to implement non-volatile memory.

A crossbar array of memristors can be configured to perform the Multiply-and-Accumulate (MAC) operations via analog circuitry. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The current in the bitline can be compared with a spiking threshold to determine whether the activation level of a neuron represented by the bitline has reached a spiking level. An array of memristors can be connected to the bitlines respectively and programmed to have thresholds corresponding to the activation level thresholds of spiking neurons. A current detector can be configured for each memristor connected to the output of a bitline to determine whether the level of electric current in the bitline corresponding to a level that exceeds the threshold of the memristor. The detection result of the current detector can represent the spiking response in the output of a spiking neuron represented by the bitline. The spiking response can be routed to a further portion of the SNN or to an output of the SNN.

Alternatively, Analog-to-Digital Converters (ADCs) can be used to measure and convert the electric currents in the bitlines into digital data for spiking detection in a comparator. However, ADCs consume more space and energy than memristors and current detectors. Thus, the use of the array of memristors and current detectors in detecting spiking to eliminate the need for ADCs can improve the space and energy efficiency of the SNN implementation.

Figure 7:
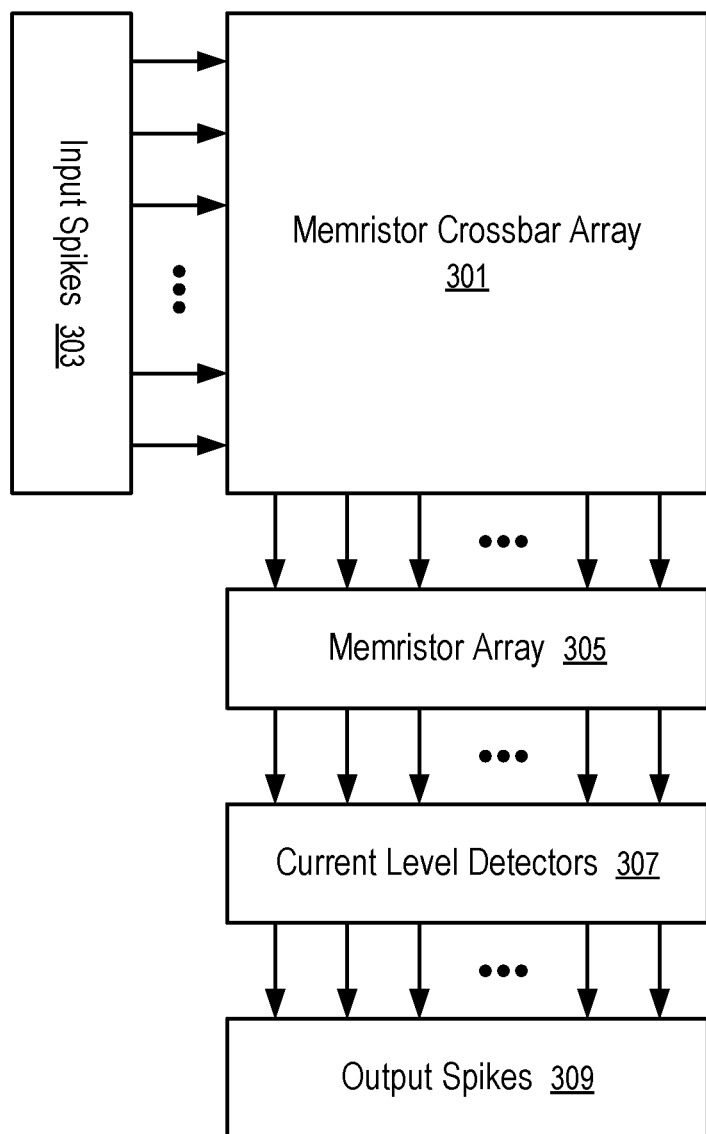
FIG. 7 shows a tile of spiking neural network implemented in a radar electronic control unit using memristors according to one embodiment.

FIG. 7 shows a tile of spiking neural network implemented using memristors according to one embodiment.

In FIG. 7, a memristor crossbar array (301) receives input voltage spikes (303) to generate electric currents going through the memristor array (305) that can function as an array of switches. Each memristor in the array (305) is programmed to have a threshold for spiking detection. When the electric current flowing through the memristor is lower than the threshold, the memristor has a substantially same electrical resistance; and the switch implemented via the memristor is considered to be in an off state. However, when the electric current flowing through the memristor reaches its threshold, the electrical resistance of the memristor drops (e.g., close to zero), causing the current flowing through the memristor to increase significantly and spike; and in such a situation, the switch implemented via the memristor is considered to be in an on state. Once the switch implemented via the memristor is in the on state, the current flowing through the memristor can increase to at least a predefined level that is independent of the threshold of the memristor and that is higher than the currents that can flow through the memristors in the array (301) before reaching the thresholds of the memristors in the array (301).

An array of current level detectors (307) can be configured to detect whether currents flowing through the memristors in the array (305) have reached the levels corresponding to the switch-on state of the memristors in the array (305). The detection can be performed based on detecting whether at least the predefined level of current is flowing through the corresponding memristors in the array (305). Thus, the current detection operations of the current level detectors (307) are independent on the thresholds of the memristors in the array (305). Based on whether or not at least the predefined level of current is present in a memristor in the array, a corresponding detector in the array of current level detectors (307) generates a digital signal indicating whether a spike in electric current is detected for a memristor in the array (305). The collection of the outputs from the current level detectors (307) provides the output spikes (309).

Figure 8:
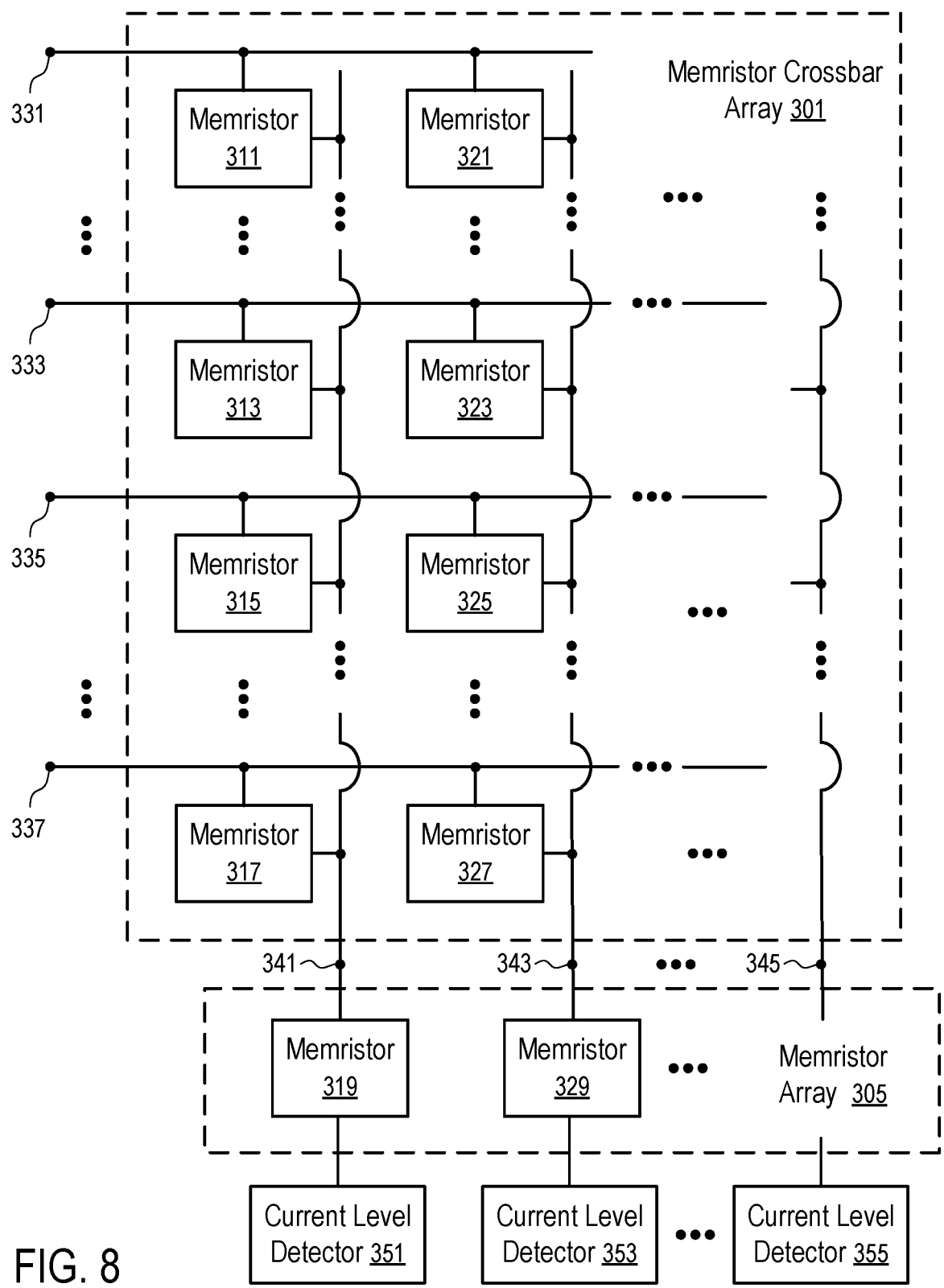
FIG. 8 illustrates the use of current spikes through a memristor array to detect spiking in a spiking neural network implemented using memristors according to one embodiment.

FIG. 8 illustrates the use of current spikes through a memristor array to detect spiking in a spiking neural network implemented using memristors according to one embodiment. For example, the crossbar array (301) and the memristor array (305) of FIG. 7 can be implemented in a way as illustrated in FIG. 8.

In FIG. 8, each of the memristors in the crossbar array (301) are connected between a wordline (e.g., 331) and a bitline (e.g., 341). The wordlines (331, . . . , 333, 335, . . . , 337) are configured to receive input voltages; the bitlines (341, 343, . . . , 345) are configured to provide output currents; and the memristor array (305) is configured to generate, according to activation level thresholds of spiking neurons, output current spikes corresponding to the spiking of neurons represented by the bitlines (341, 343, . . . , 345).

For example, when a voltage is applied on the wordline (331), the voltage generates currents flowing to the bitlines (341, 343, . . . , 345) through the memristors (311, 321, . . . ) respectively. The contributions from the voltage applied on the wordline (331) to the currents in the bitlines (341, 343, . . . , 345) are proportional to weights and responses of neurons to the input represented by the voltage applied on the wordline (331). The weights and responses of neurons can be implemented via programming the resistances of the memristors (311, 321, . . . ) respectively.

The bitlines (341, 343, . . . , 345) sum the electric currents contributed from the voltages applied on the wordlines (331, . . . , 333, 335, . . . , 337) to the bitlines (341, 343, . . . , 345). Thus, the currents in the bitlines (341, 343, . . . , 345) correspond to the summation of the multiplications of the weights and responses of neurons, implemented via the programmed resistances of the crossbar array (301), with the voltages of the wordlines (331, . . . , 333, 335, . . . , 337) that represent the input to the neurons.

For example, the contributions of the voltages on the wordlines (331, . . . , 333, 335, . . . , 337) to the bitline (341) are summed via the currents flowing from the wordlines (331, . . . , 333, 335, . . . , 337) through the memristors (311, . . . , 313, 315, . . . , 317) to the bitline (341); and the contributions of the voltages on the wordlines (331, . . . , 333, 335, . . . , 337) to the bitline (343) are summed via the currents flowing from the wordlines (331, . . . , 333, 335, . . . , 337) through the memristors (321, . . . , 323, 325, . . . , 327) to the bitline (343); etc.

Thus, the crossbar array (301) performs Multiply-and-Accumulate (MAC) operations by converting the voltages on the wordlines (331, . . . , 333, 335, . . . , 337) to the currents on bitlines (341, 343, . . . , 345).

In FIG. 8, instead of using ADCs to measure the currents flowing through the bitlines (341, 343, . . . , 345), a memristor array (305) is used to generate current spikes based on thresholds of memristors (319, 329, . . . ) that are connected to the bitlines (341, 343, . . . ) respectively.

For example, a memristor (319) is connected to the bitline (341) and programmed to have a threshold corresponding to the threshold of activation level of a spiking neuron. When the current on the bitline (341) is less than the current threshold, the memristor (319) has a first resistance corresponding to a switch-off state; and when the current on the bitline (341) has reached the current threshold, the memristor (319) has a second resistance corresponding to a switch-off state, which is significantly lower than the first resistance.

A current level detector (351) is configured to detect whether or not the current on the bitline (341) is at a level corresponding to the switch-on state of the memristor (319), which indicates whether or not a spike is produced by a spiking neuron corresponding to the bitline (341).

Thus, the outputs of the current level detectors (351, 353, ..., 355) correspond to the output spikes (309) of the bitlines (341, 343, ..., 345).

For example, a spike train can be applied on the wordline (331). The spike train is a time sequence of the voltages applied on the wordline (331). Voltages in the spike train can be scheduled at a fixed time interval. The voltages in the spike train can be selected from two predetermined voltages. One of the voltages corresponds to the presence of a spike at a time instance in the spike train; and the other corresponds to the absence of a spike at a time instance in the spike train.

For example, a data item containing a number of bits can be converted into a spike train on the same number of time instances. The voltage applied at each of the time instances is based on the value of the corresponding bit in the data item.

When a set of spike trains are applied to the set of wordlines (331, ..., 333, 335, ..., 337) respectively, the outputs of the current level detectors (351, 353, ..., 355) generate a set of output spike trains, which can be further processed by another tile of spiking neural network.

The resistance values of the memristors in the crossbar array (301) can be set to model the behavior of a spiking neural network. The resistance values of the memristors in the crossbar array (301) can be changed via programming the memristors by selectively applying currents and/or voltages. For example, after a memristor (e.g., 311) is selected for programming, a voltage applied on the memristor (e.g., 311) can be raised to place the memristor (e.g., 311) in a switch-on state; and then programming pulses can be applied on the memristor (e.g., 311) to adjust the resistance of the memristor (e.g., 311) to a desired value. After the programming, the memristor (e.g., 311) remembers its programmed resistance during its switch-off state, until the memristor (e.g., 311) is again selected for programming under the switch-on state. A separate circuit can be used to select memristor (e.g., 311) and program the resistance of the memristor (e.g., 311).

Figure 9:
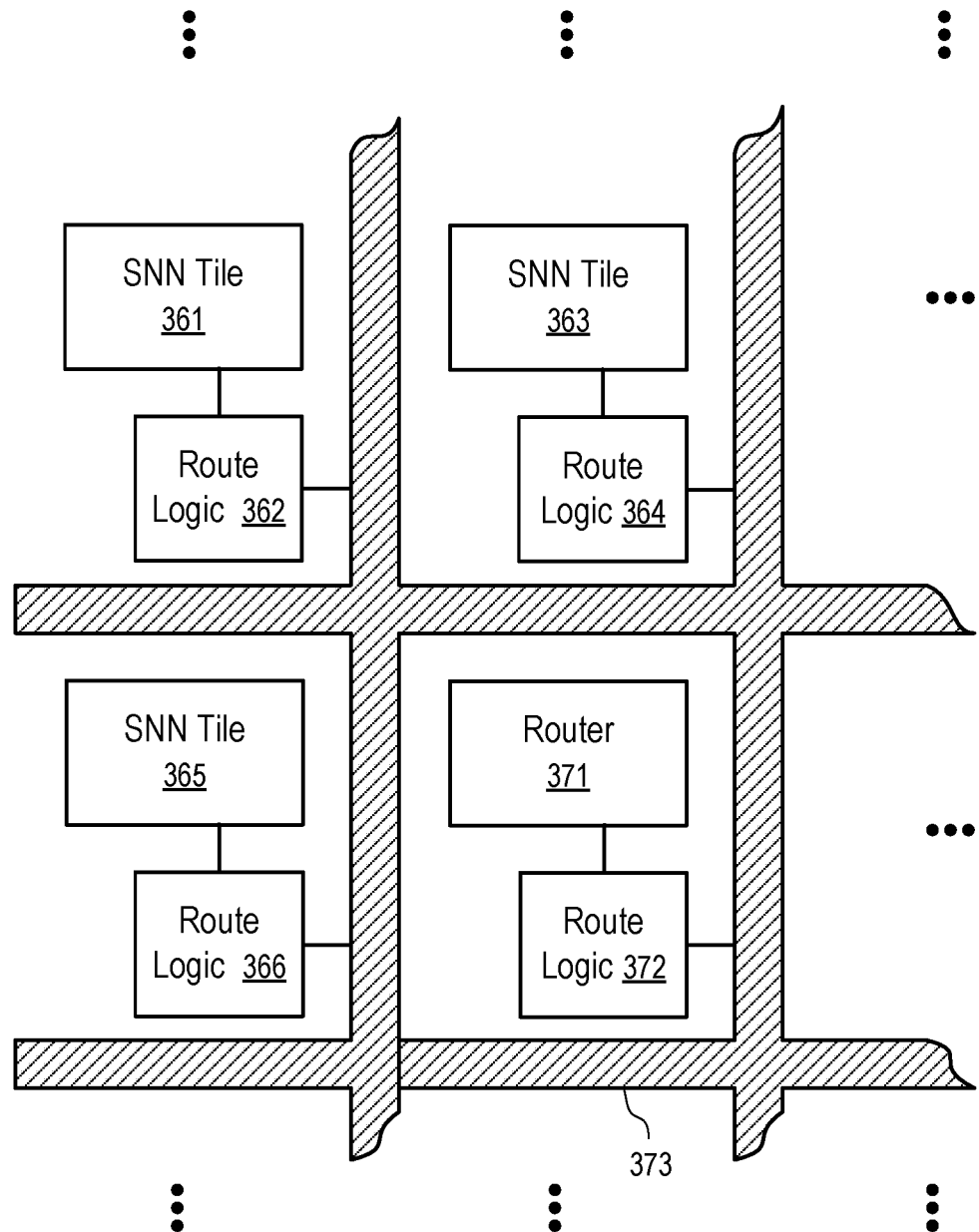
FIG. 9 illustrates a spiking neural network implemented using a network of spiking neural network tiles according to one embodiment.

FIG. 9 illustrates a spiking neural network implemented using a network of spiking neural network tiles according to one embodiment.

In FIG. 9, a plurality of SNN tiles (361, 363, 365, ...) are configured on an integrated circuit die. Each SNN tile (e.g., 361, 363, or 365) can be implemented in a way illustrated in FIG. 7 and/or FIG. 8. Each SNN tile (e.g., 361, 363, or 365) has an associated route logic (e.g., 362, 364, or 366) configured to provide input spike data (e.g., 303) from a communication network (373) to the SNN tile and transmit its output spike data (e.g., 309) via the communication network (373) to other SNN tiles.

For example, each SNN tile (e.g., 361, 363, or 365) and the router (371) can have a unique address for the data transmission over the communication network (373). An input spike train address to an SNN tile (e.g., 361) is received by the its route logic (e.g., 362), which generates respective voltages for the wordlines (e.g., 331, ..., 333, 335, ..., 337) of the tile (e.g., 301) to cause the tile (e.g., 301) to generate output spikes (309) via the current level detectors (e.g., 351, 353, ..., 355) connected to the bitlines (e.g., 341, 343, ..., 345) of the SNN tile (e.g., 301). The route logic (e.g., 362) then transmits the output spikes to the router (371). The router (371) is configured to route the output spikes to the next tile(s) (e.g., 363, and/or 365) according to the neural connectivity in the spiking neural network.

The router (371) is configured on the integrated circuit die to route the input/output spikes to or from the SNN tiles (e.g., 361, 363, and/or 365) (e.g., according to a routing table configured according to the neural connectivity in a spiking neural network). Thus, the SNN tiles (e.g., 361, 363, or 365) on the integrate circuit die can be re-configured via the router (371) to model different spiking neural networks of different neuron connectivity configurations.

Figure 10:
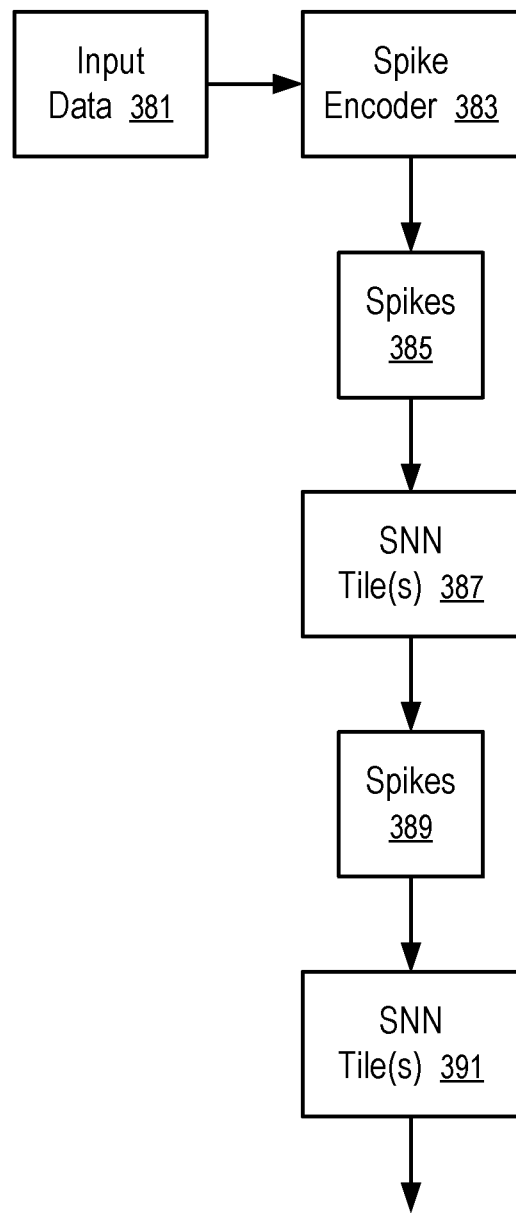
FIG. 10 illustrates the processing of a spiking neural network by detecting spikes using memristors and routing the detected spikes among memristor tiles.

FIG. 10 illustrates the processing of a spiking neural network by detecting spikes using memristors and routing the detected spikes among memristor tiles.

In FIG. 10, input data (381) to a spiking neural network is converted by a spike encoder (383) to generate spikes (385) as inputs to one or more SNN tiles (387). Each of the SNN tiles (387) can be implemented in a way illustrated in FIG. 7 or FIG. 8, where the output spikes in electronic currents in the bitlines (e.g., 341, 343, ..., 345) are detected via an array (305) of memristors having thresholds configured according to the thresholds of the activation levels of spiking neurons. The current level detectors (351, 353, ..., 355) generate digital data of output spikes (309) that can be provided as input spikes (389) to further SNN tile(s) (391). Further layers of SNN tiles can be added in a way similar to the use of the second layer of tiles (391).

The tiles (e.g., 387 and 391) used in FIG. 10 can be the tiles (361, 363, 365, ...) configured on an integrated circuit die. Some of the tiles (361, 363, 365, ...) on the integrated circuit die can be reconfigured to model different portions of spiking neurons in a network at different times.

For example, the first layer of SNN tiles (387) can be initially configured on the tiles (361, 363, 365) by programming the resistance of the memristors (e.g., 311 to 317, 321 to 327, ...) in the crossbar array (301) of each tile (e.g., 301) and by programming the thresholds of the memristors (e.g. 319, 329, ...) for spike detection. Subsequent, some of the tiles (361, 363, 365) can be reprogrammed as the SNN tiles (391) for the second layer processing.

Figure 11:
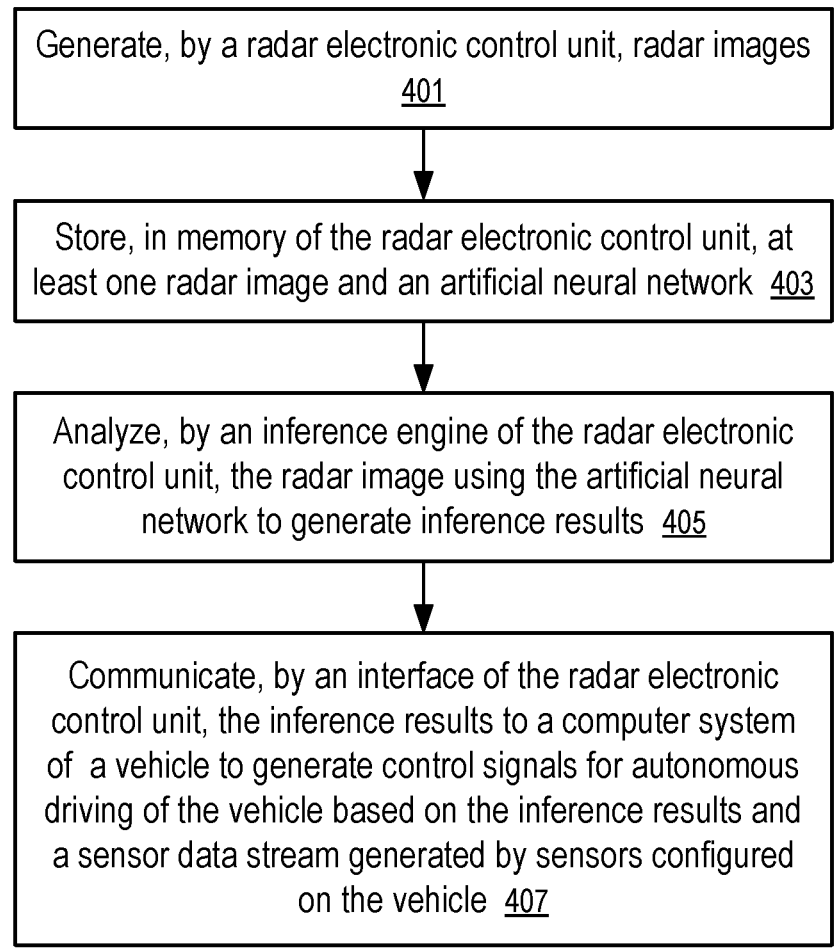
FIG. 11 shows a method of a radar electronic control unit according to one embodiment.

FIG. 11 shows a method of a radar electronic control unit according to one embodiment. For example, the method of FIG. 11 can be implemented in a radar ECU (101) of FIG. 1 or 5 in a vehicle (211) of FIG. 2 or 3.

At block 401, a radar electronic control unit (101) generates radar images (107).

For example, the radar electronic control unit (101) includes a transceiver (125, 127) coupled to at least one antenna (e.g., 121 and 123). A frequency modulated continuous wave generator (137) of the radar ECU (101) is configured to generate a first version of radar signals transmitted by the transceiver (125) through the at least one antenna (121). The transceiver (127) is configured to receive, via the at least one antenna (123) a second version of radar signals reflected, at a plurality of points in a three-dimensional space around the radar electronic control unit (101), back to the at least one antenna (123). A mixer (133) of the radar ECU (101) is configured to combine the first version of radar signals and the second version of radar signals to generate result signals. A detector (115) is configured to generate a radar image (107) based on the result signals from the mixer. The radar image (107) identifies at least one parameter of the plurality of points that reflect radar signals back to the at least one antenna (123), such as the speed or range of the plurality of points relative to the at least one antenna (123).

For example, the transceiver can include a low noise amplifier (127) coupled to a receiving antenna (123) and a power amplifier (125) coupled to the transmission antenna (121).

For example, the radar ECU (101) can include an analog to digital converter (135) coupled to the mixer (133) to digitize the result signals. A low pass filter (119) is configured to remove, from the result signals of the mixer (113), signals having frequencies equal to or higher than a baseband frequency of radar signals generated by the frequency modulated continuous wave generator (137). A faster Fourier transform is configured to process input from the low pass filter (119); and a tone detector (115) is configured to determine the parameter based on a tone frequency in the output of the low pass filter (119).

At block 403, at least one radar image (107) and an artificial neural network (113) for the processing of the radar image (107) are stored in memory (111) of the radar electronic control unit (101).

At block 405, an inference engine (103) of the radar electronic control unit (101) analyzes the radar image (107) using the artificial neural network (113) to generate inference results (109).

For example, the radar image (107) can be analyzed to determine an identification or a classification of an object captured in the radar image (107).

For example, the radar image (107) can be analyzed to by the ANN (113) to extract a portion showing the object and removing other portions to reduce the amount of image data to be further analyzed for sensor fusion.

For example, a portion of the sensor data stream (221) can be provided as an input stream to the radar ECU (101); and the inference engine (103) uses the ANN (113) to perform sensor fusion by combining the radar image (107), or a portion of it showing the captured object, and the portion of the sensor data stream (221) to generate the inference results (109).

Optionally, the analysis of the radar image (107) by the inference engine (103) can include matrix multiplication and accumulation operations performed using a memristor crossbar array (301). The memristors in the crossbar array (301) are configured to store parameters of the artificial neural network (113).

At block 407, an interface (105) of the radar electronic control unit (101) communicates the inference results (109) to a computer system (231) of a vehicle (211) to generate control signals for autonomous driving of the vehicle (211) based on the inference results (107) and a sensor data stream (221) generated by sensors (222) configured on the vehicle (211).

For example, the ANN (113) can include a Spiking Neural Network (SNN) implemented using a crossbar array (301) of first memristors (311 to 317; 321 to 327, . . . ). Each of the first memristors is connected between a wordline (e.g., 331, . . . , 333, 335, . . . , or 337) and a bitline (e.g., 341, 343, . . . , or 345) to convert a voltage applied on the wordline into a current in the bitline; and each respective bitline (e.g., 341) of the crossbar array (301) sums currents converted by a column (e.g., 311 to 317) of the first memristors to the respective bitline (e.g., 341).

Further, the SNN is implemented using second memristors (319, 329, . . . ) connected to bitlines (341, 343, . . . ) of the crossbar array (301) respectively. Each of the second memristors (319, 329, . . . ) is programmed to have a threshold for current according to an activation level threshold of a spiking neuron. Thus, spiking of the neuron can be detected by detecting a high current level (e.g., above a predetermined level) that is higher than the thresholds of the second memristors (319, 329, . . . ).

Optionally, the inference engine (103) includes a neural network accelerator (259) implemented using a memristor crossbar array (301). The memristor crossbar array is configured to perform matrix multiplication and accumulation operations by converting voltages on wordlines (331, . . . , 333, 335, . . . , 337) of the crossbar array (301) into currents summed in bitlines (341, 343, . . . , 345) of the crossbar array (301). The memristors (311 to 317; 321 to 327; . . . ) in the crossbar array (301) are configured to store parameters of the artificial neural network (113); and the electrical resistances of the memristors (311 to 317; 321 to 327; . . . ) are programmed according to the parameters of the artificial neural network (113).

In general, the server (219), the computer system (231), the data storage device (212), and the radar ECU (101) can each be implemented as one or more data processing systems.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A radar electronic control unit, comprising:
   a transceiver coupled to at least one antenna;
   a frequency modulated continuous wave generator configured to generate a first version of radar signals transmitted by the transceiver through the at least one antenna, the transceiver configured to receive, via the at least one antenna, a second version of radar signals reflected, at a plurality of points in a three-dimensional space around the radar electronic control unit, back to the at least one antenna;
   a mixer configured to combine the first version of radar signals and the second version of radar signals to generate result signals;
   a detector configured to generate a radar image based on the result signals from the mixer, the radar image identifying at least one parameter of the plurality of points that reflect radar signals back to the at least one antenna;
   memory configured to store the radar image and an artificial neural network comprising a spiking neural network, wherein the spiking neural network is implemented using a crossbar array of first memristors; each of the first memristors is connected between a wordline and a bitline to convert a voltage applied on the wordline into a current in the bitline; and each respective bitline of the crossbar array sums currents converted by a column of the first memristors to the respective bitline;
   an inference engine configured to use the artificial neural network to analyze the radar image and generate inference results; and a host interface configured to provide the inference results to a computer system of a vehicle, wherein the computer system is configured to generate signals configured to control the vehicle based on the inference results.

2. The radar electronic control unit of claim 1, wherein the at least one antenna includes a transmission antenna and a receiving antenna; and the transceiver includes a low noise amplifier coupled to the receiving antenna and a power amplifier coupled to the transmission antenna.

3. The radar electronic control unit of claim 2, further comprising:
   an analog to digital converter coupled to the mixer to digitize the result signals;
   a low pass filter configured to remove, from the result signals, signals having frequencies equal to or higher than a baseband frequency of radar signals generated by the frequency modulated continuous wave generator; and
   a faster Fourier transform configured to process input from the low pass filter, wherein the detector is configured to determine the parameter based on a tone frequency in output of the low pass filter.

4. The radar electronic control unit of claim 3, wherein the parameter is speed or range relative to the at least one antenna.

5. The radar electronic control unit of claim 4, wherein the inference engine includes a neural network accelerator having a memristor crossbar array configured to perform matrix multiplication and accumulation operations.

6. The radar electronic control unit of claim 5, wherein memristors in the crossbar array are configured to store parameters of the artificial neural network.

7. The radar electronic control unit of claim 6, wherein the multiplication and accumulation operations are performed by the memristors converting voltages on wordlines of the crossbar array into currents summed in bitlines of the crossbar array.

8. The radar electronic control unit of claim 1, wherein the spiking neural network is further implemented using second memristors connected to bitlines of the crossbar array respectively; each of the second memristors is programmed to have a threshold for current according to an activation level threshold of a spiking neuron.

9. A vehicle, comprising:
   a plurality of controls for steering, braking, and acceleration;
   a set of sensors configured to generate a sensor data stream;
   a radar electronic control unit comprising:
      a generator of radar images;
      a memory configured to store a radar image and an artificial neural network;
      an inference engine configured to use the artificial neural network to analyze the radar image and generate inference results, wherein the inference engine includes a memristor crossbar array configured to store parameters of the artificial neural network and to perform matrix multiplication and accumulation operations in the artificial neural network; and
      a communication interface;
   a computer system coupled to the communication interface to implement an advanced driver assistance system to operate the controls according to the inference results and the sensor data stream.

10. The vehicle of claim 9, wherein the inference results identify an object that reflects radar signals in the radar image.

11. The vehicle of claim 10, wherein the inference results include a portion extracted from the radar image using the artificial neural network.

12. The vehicle of claim 9, wherein a portion of the sensor data stream is provided to the radar electronic control unit to implement sensor fusion based on the radar image and the portion of the sensor data.

13. A method, comprising:
   generating, by a radar electronic control unit, radar images;
   storing, in memory of the radar electronic control unit, at least one radar image and an artificial neural network;
   analyzing, by an inference engine of the radar electronic control unit, the radar image using the artificial neural network to generate inference results, wherein the analyzing comprises:
      determining an identification or a classification of an object captured in the radar image; and
      extracting, from the radar image, a portion of the radar image showing the object; and
   communicating, by an interface of the radar electronic control unit, the inference results to a computer system of a vehicle, wherein the computer system is configured to generate control signals for autonomous driving of the vehicle based on the inference results and a sensor data stream generated by sensors configured on the vehicle.

14. The method of claim 13, further comprising:
   receiving, in the radar electronic control unit, a portion of the sensor data stream; and
   performing sensor fusion operations, by the inference engine using the artificial neural network, based on the radar image and the portion of the sensor data stream to generate the inference results.

15. The method of claim 13, wherein the analyzing includes performing matrix multiplication and accumulation operations using a memristor crossbar array configured to store parameters of the artificial neural network.

* * * * *